(12) United States Patent
Okoshi

(10) Patent No.: US 7,014,322 B2
(45) Date of Patent: Mar. 21, 2006

(54) DUCT AND PROJECTOR

(75) Inventor: Masayuki Okoshi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 26 days.

(21) Appl. No.: 10/896,930

(22) Filed: Jul. 23, 2004

(65) Prior Publication Data

US 2005/0057730 A1    Mar. 17, 2005

(30) Foreign Application Priority Data

Jul. 28, 2003    (JP) ............................. 2003-202271

(51) Int. Cl.
*G03B 21/16* (2006.01)
(52) U.S. Cl. ............................. 353/61; 353/57; 362/373
(58) Field of Classification Search ............... 349/5, 349/7; 353/57, 60, 61, 58, 119; 362/96, 362/373; 313/35, 36
See application file for complete search history.

(56) References Cited

U.S. PATENT DOCUMENTS

| | | | |
|---|---|---|---|
| 6,793,343 B1 * | 9/2004 | Nakano et al. ............... | 353/61 |
| 6,913,361 B1 * | 7/2005 | Gishi et al. .................... | 353/58 |
| 2001/0021006 A1 * | 9/2001 | Shimizu ....................... | 353/57 |
| 2002/0163627 A1 * | 11/2002 | Ohishi et al. ................. | 353/58 |
| 2004/0169825 A1 * | 9/2004 | Ozawa et al. ................. | 353/61 |
| 2005/0007558 A1 * | 1/2005 | Shiraishi et al. .............. | 353/61 |

FOREIGN PATENT DOCUMENTS

| | | |
|---|---|---|
| JP | 8-69053 | 3/1996 |
| JP | A 9-83914 | 3/1997 |
| JP | A 2001-330890 | 11/2001 |
| JP | A 2002-214710 | 7/2002 |
| JP | A 2002-244215 | 8/2002 |
| JP | A 2002-365728 | 12/2002 |
| JP | A 2003-215710 | 7/2003 |

* cited by examiner

*Primary Examiner*—William C. Dowling
(74) *Attorney, Agent, or Firm*—Oliff & Berridge, PLC

(57) ABSTRACT

A suction-side duct (73) is interposed between a light source device (411) and an exhaust fan (72) and includes a first suction hole (731A1) for drawing in a heated air heated by the light source device (411) and a discharge hole (732B) for discharging the indrawn heated air toward the exhaust fan (72). The first suction hole (731A1) and the discharge hole (732B) are located not to interfere with each other on a plane seen from a suction direction or a discharge direction of the heated air.

7 Claims, 10 Drawing Sheets

DUCT AND PROJECTOR

BACKGROUND OF THE INVENTION

1. Field of the Invention

The present invention relates to a duct having a cylindrical shape for circulating a heated air, and a projector.

2. Description of Related Art

Conventionally, a projector that modulates a light beam irradiated by a light source in accordance with image information to form an optical image by way of a modulator and projects the optical image in an enlarged manner has been known (e.g., refer to JP2002-365728A).

The projector has an axial-flow exhaust fan that discharges a heated air heated by the light source to the outside of the projector with the temperature of the heated air becoming higher along with the higher luminance of the light source. The axial-flow exhaust fan is disposed near the light source to draw in the heated air inside the projector and to discharge the indrawn air from an exhaust port formed on an exterior case of the projector. Additionally, a plurality of blades inclined at a predetermined angle are provided on the exhaust port to guide an exhaust airflow in a predetermined direction. With the blades, the heated air is discharged in a direction in which a viewer of a projected image around the projector nor the projected image projected by the projector are not presented.

However, in the above-described arrangement, when a part of the light beam irradiated by the light source is deviated from an illumination optical axis to leak inside the projector, only the incident light beam orthogonal to the exhaust port can be shielded by the blades, but the incident light beam in an inclination direction of the blades cannot be shielded. Accordingly, the light beam leaked via the exhaust port in the inclination direction of the blades may cause the viewer feeling uncomfortable when he/she views the projected image projected by the projector.

SUMMARY OF THE INVENTION

An object of the present invention is to provide a duct and a projector that can shield a light leaking from a light source device.

A duct according to an aspect of the present invention having a cylindrical shape and circulating a heated air, which is interposed between a light source device that irradiates a light beam and a cooling fan that sucks and discharges an air, the duct includes: a first suction hole that draws in the air heated by the light source device to the inside of the duct; and a discharge hole that discharges the indrawn heated air toward the cooling fan, in which the first suction hole and the discharge hole are located not to interfere with each other on a plane seen from a suction direction or a discharge direction of the heated air.

Note that, the duct may be any shape as long as the first suction hole and the discharge hole are located not to interfere with each other on a plane seen from the suction direction or the discharge direction of the heated air. For example, the duct may be an approximately planarly-viewed cranked shape with a first suction hole formed at an end thereof, and a discharge hole formed at the other end thereof. Besides, the end may be disposed around the light source device whereas the other end may be disposed around the cooling fan. Or, the duct may be an approximately rectangular parallelepiped with a first suction hole formed at an end opposite to the light source device and a discharge hole formed at an end opposite to the cooling fan.

With the above aspect of the present invention, the duct is interposed between the light source device and the cooling fan with the first suction hole and the discharge hole located not to interfere with each other on a plane seen from the suction direction or the discharge direction of the heated air. Accordingly, in the case that the duct is installed on an optical equipment having a light source device and a cooling fan for instance, even when a part of the light beam irradiated by the light source device is deviated from an illumination optical axis to leak inside the optical equipment, the leaked light heading to the cooling fan from the light source device can be shielded by an outer side or an inner side of the duct.

Thus, the light beam leaked from the exhaust port formed at the optical equipment toward the outside of the optical equipment through the cooling fan can be reduced.

Preferably, the duct may be formed by combining two plate bodies having approximately U-shaped cross-sections with the first suction hole and the discharge hole respectively formed.

With this arrangement, since the duct is formed by combining the two plate bodies having approximately U-shaped cross-sections so as to be an approximately rectangular parallelepiped, the duct can be downsized as compared to the one formed in an approximately planarly-viewed cranked shape. Therefore, the duct can be placed without a gap between the light source device and the cooling fan formed larger than necessary. For example, if the two plate bodies are formed by injection molding or the like, the duct can easily be manufactured.

Further, since the two plate bodies are so arranged that a connected part of the two plate bodies intersect with a line connecting the light source device and the cooling fan, the light beam can be prevented from leaking via the connected part.

Preferably, in above the duct, the first suction hole may draw in the heated air circulating inside the light source device to the inside of the duct, and the duct further may include a second suction hole that draws in a heated air circulating along an outer side of the light source device to the inside of the duct in addition to the first suction hole and the discharge hole.

With this arrangement, since the duct has the second suction hole, the heated air remained inside the light source device as well as the one remained at the outer side, e.g., the rear side of the light source device can be guided toward the cooling fan. Therefore, the leaked light from the light source device can be shielded while the cooling efficiency of the light source device can be enhanced.

A projector according to another aspect of the present invention includes: a light source device; an optical modulator that modulates a light beam irradiated by the light source device in accordance with image information; a projection optical device that projects the modulated light beam in an enlarged manner; the above-described duct; and a cooling fan that sucks and discharges the heated air discharged from the duct.

With this arrangement, since the projector has the above-described duct and the cooling fan, the same functions and advantages as the above-described duct can be obtained. Further, the light shielding for the light beam heading to the cooling fan from the light source device can reduce the light leakage to the outside via the exhaust port formed at the projector, thus avoiding the viewer of the projected image from feeling uncomfortable.

Preferably, in the above projector, a suction face of the cooling fan from which the heated air is sucked may be inclined relative to a discharge face of the discharge hole of the duct so that the cooling fan sucks and discharges the heated air inside the projector together with the heated air passing through the duct, a louver with a plurality of blades arranged in parallel may be provided to the cooling fan on a discharge side of the heated air, and the plurality of blades may extend in a direction in which the heated air passing through the duct and the heated air inside the projector are combined.

With this arrangement, the louver provided in the cooling fan at the discharge side of the heated air has the plurality of blades arranged in parallel, the plurality of blades extending in a direction in which the heated air passing through the duct and the heated air inside the projector are combined. Accordingly, the exhaust airflow of the heated air can properly be rectified while the temperature of the exhaust airflow can be lowered by mixing the heated air caused by the light source device and the heated air generated inside projector.

DETAILED DESCRIPTION OF PREFERRED EMBODIMENT(S)

An embodiment of the present invention will be described below with reference to the attached drawings.

(1) External Arrangement

Figure 1:
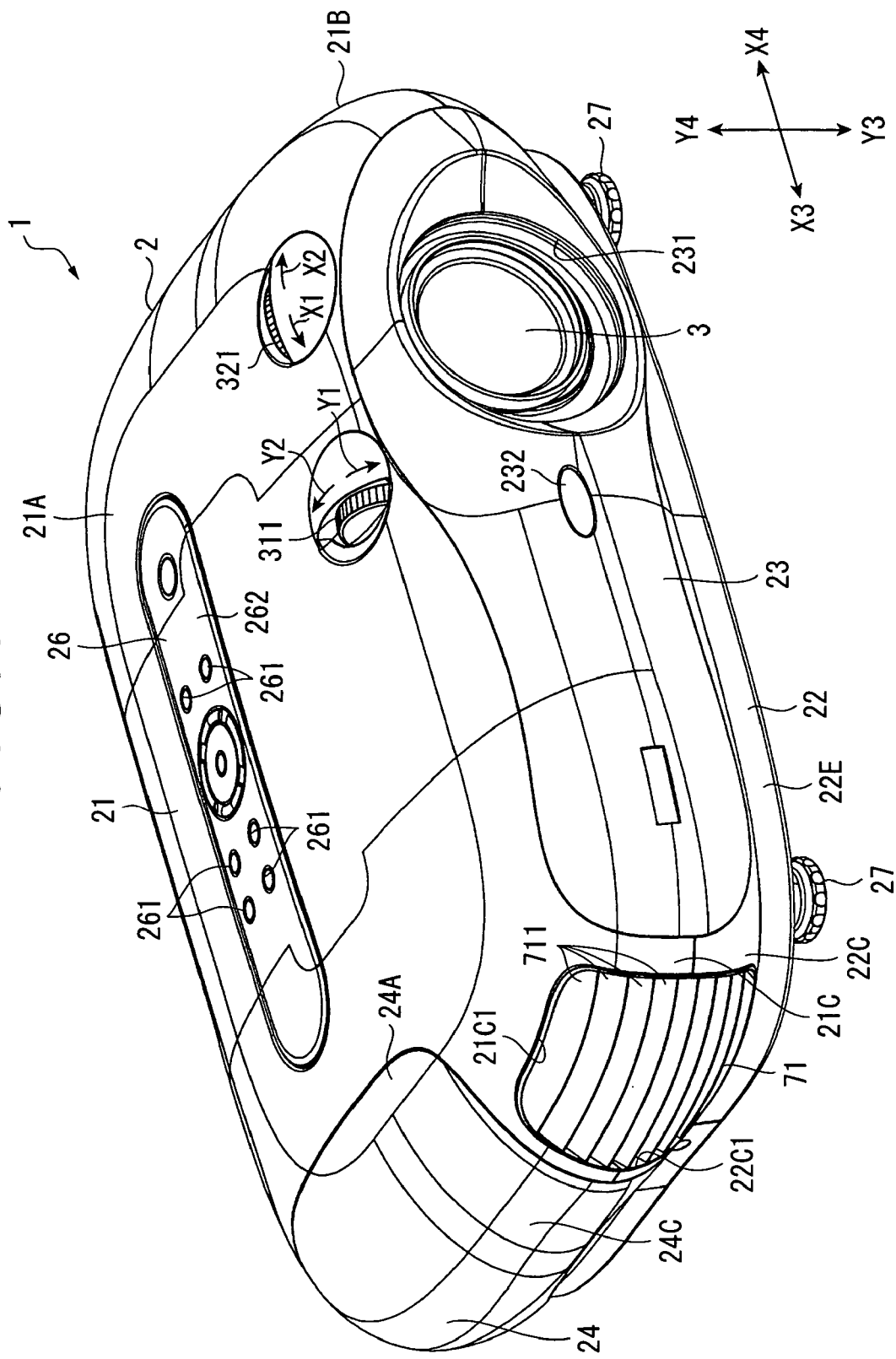
FIG. 1 is a perspective view showing an upper front side of the projector according to an embodiment of the present invention.
Figure 2:
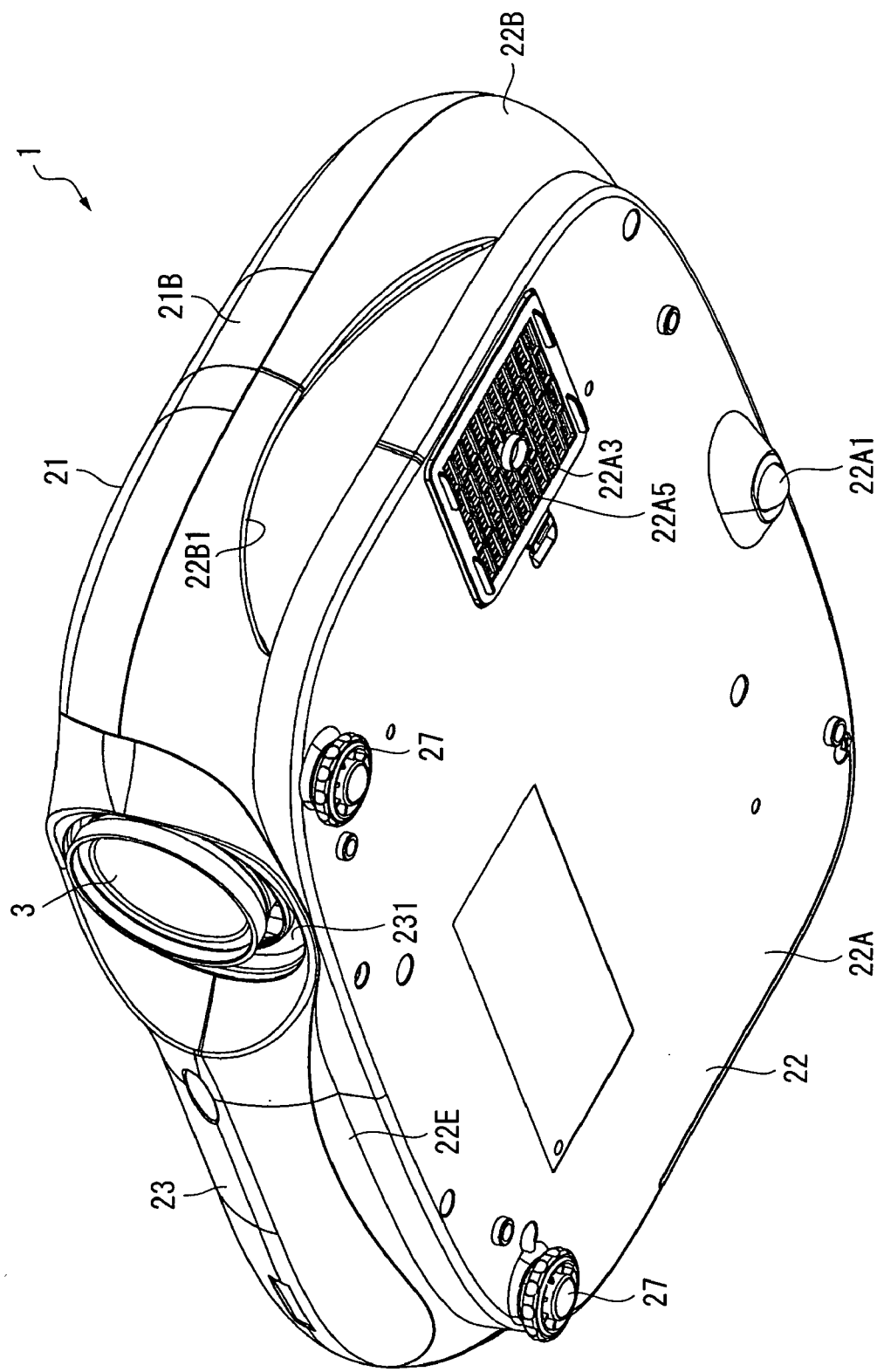
FIG. 2 is a perspective view showing a lower front side of the projector of the aforesaid embodiment.
Figure 3:
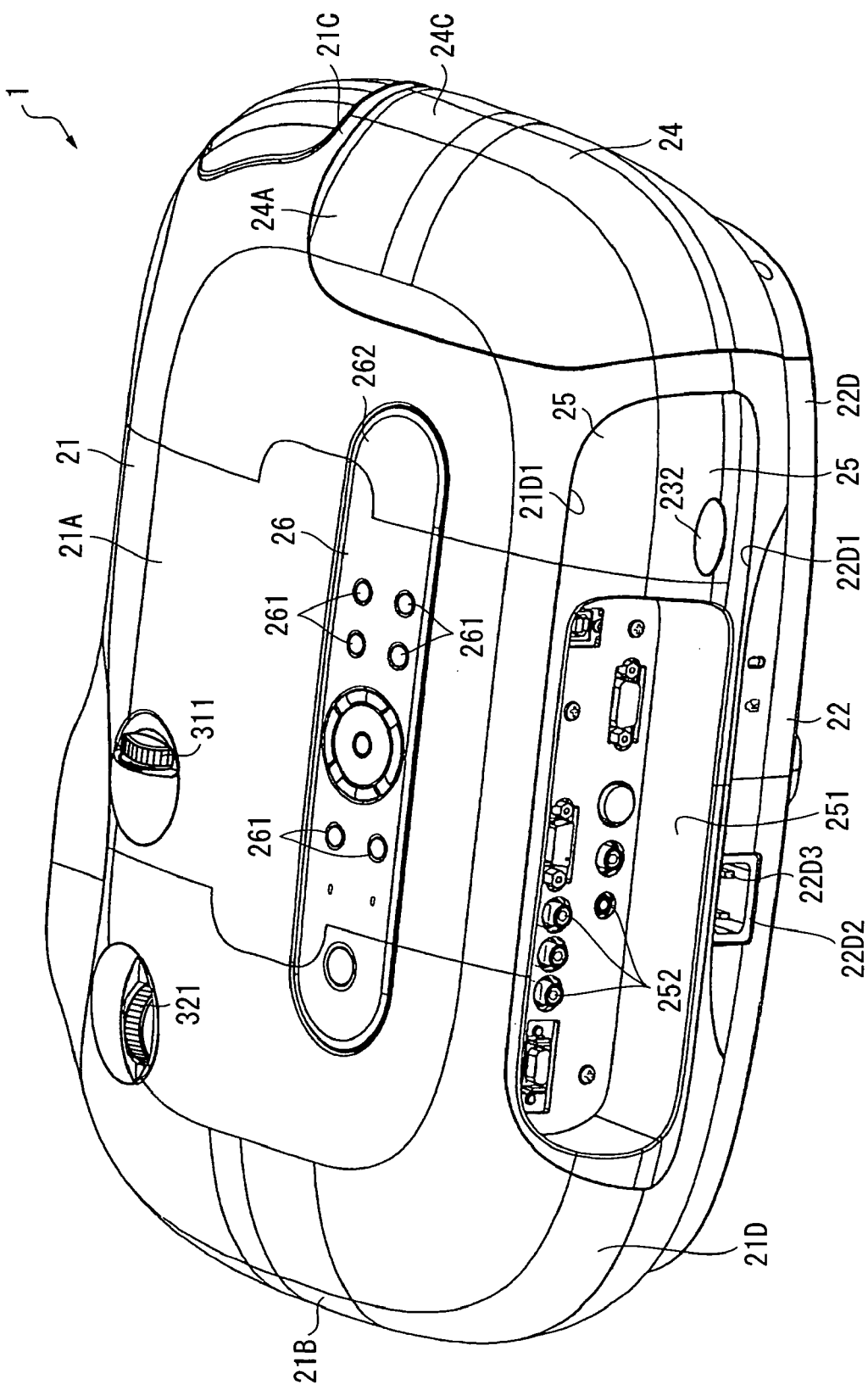
FIG. 3 is a perspective view showing an upper rear side of the projector of the aforesaid embodiment.
Figure 4:
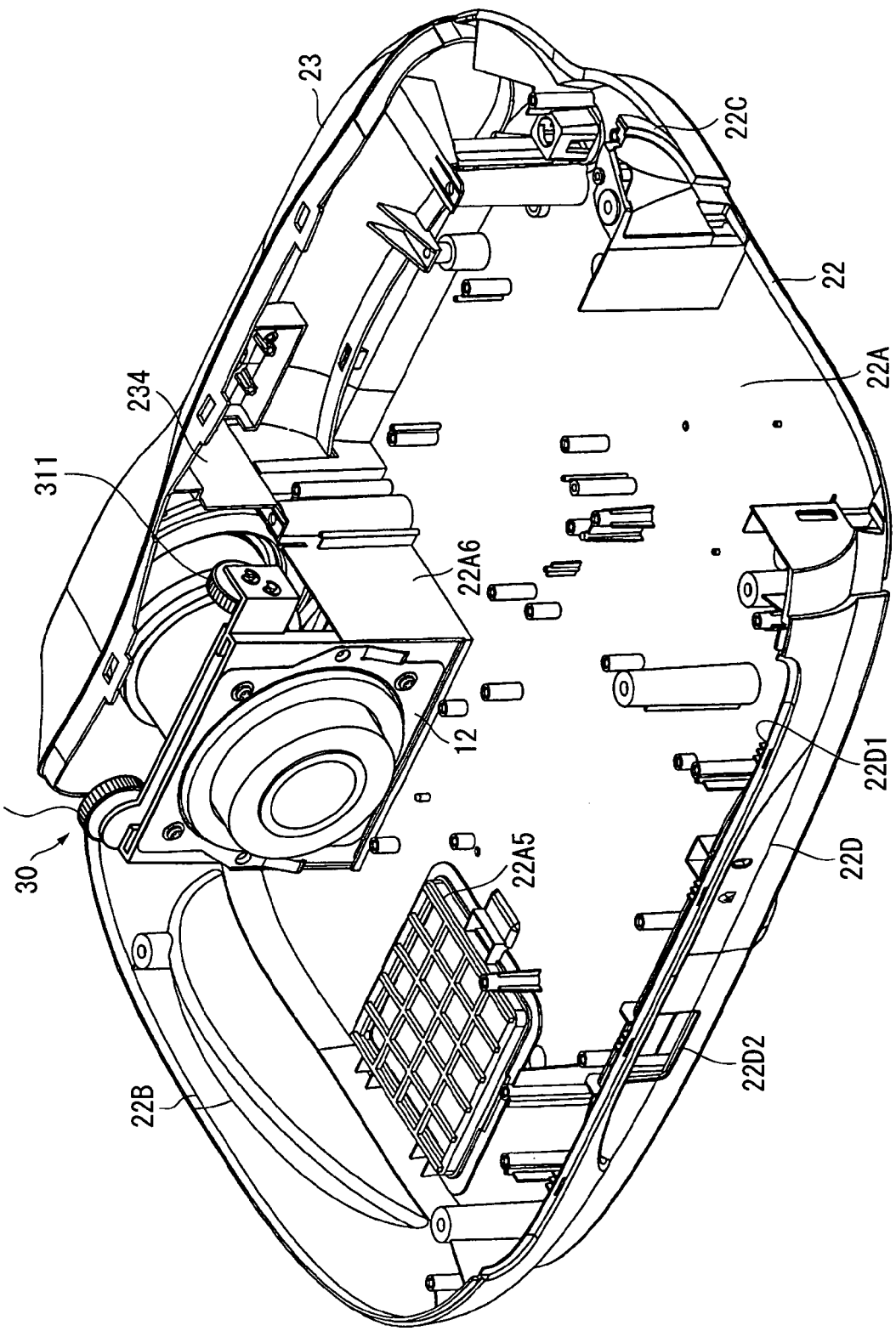
FIG. 4 is a perspective view showing an upper side of a lower case and a front case of the projector of the aforesaid embodiment.

FIG. 1 is a perspective view showing an upper front side of a projector 1 according to the present embodiment. FIG. 2 is a perspective view showing a lower front side of the projector 1. FIG. 3 is a perspective view showing an upper rear side of the projector 1. FIG. 4 is a perspective view showing a part of an exterior case 2 of the projector 1.

The projector 1 modulates a light beam irradiated by a light source in accordance with image information and projects the light beam on a projection surface such as a screen in an enlarged manner. As shown in FIGS. 1 to 3, the projector 1 has an approximately rectangular parallelepiped exterior case 2 and a projection lens 3 exposed from the exterior case 2.

The projection lens 3 serves as a projection optical device that projects in an enlarged manner an optical image modulated by a liquid crystal panel, which is a below-described optical modulator. The projection lens 3 is configured as a lens set including a plurality of lenses housed in a lens barrel.

The exterior case 2 is an approximately planarly-viewed rectangular casing made of synthetic resin, which houses a device body including an optical unit (described below) of the projector 1. The exterior case 2 has an upper case 21 covering an upper section of the device body, a lower case 22 covering a lower section of the device body, a front case 23 covering a front section of the device body, a side case 24 covering a part of a lateral section of the device body and a rear case 25 (see FIG. 3) covering a rear section of the device body.

Note that, each corner of the upper side, the front side, the lateral side, the bottom side and the rear side of the exterior case 2 is curved.

The upper case 21 has an approximately planarly-viewed rectangular upper side 21A covering the upper section of the device body, a lateral side 21B extending substantially vertically downward from a longitudinal edge of the upper side 21A, a lateral side 21C extending substantially vertically downward from the other longitudinal edge of the upper side 21A, and a rear side 21D (see FIG. 3) extending substantially vertically downward from a rear edge of the upper side 21A.

As shown in FIG. 1 or 3, an operation panel 26 for actuating and adjusting the projector 1 is provided approximately at the center of the rear side of the upper side 21A extending horizontally. Pushing an operation button 261 of the operation panel 26 causes contact with a tactile switch installed on a circuit board (not shown) disposed inside the operation panel 26 to allow a desired operation. Additionally, an LED (not shown here) is mounted on the circuit board so that the LED emits a light in response to the desired operation.

A decorative board 262 is provided on the operation panel 26 so that the operation button 261 is surrounded by the decorative board 262. The light emitted by the LED is diffused via the decorative board 262.

Two dials 311 and 321 of a projection lens position adjuster 30 (see FIG. 4) for vertically and horizontally moving the projection lens 3 to adjust the position of the projection lens 3 are exposed from the front side of the upper side 21A (right side in FIG. 1). When the dial 311 disposed at the left side in FIG. 1 out of the two dials 311 and 321 is moved in Y1 direction (downward), the projection lens 3 is moved in Y3 direction (downward). In contrast, when the dial 311 is moved in Y2 direction (upward), the projection lens 3 is moved in Y4 direction (upward).

When the dial 321 disposed at the right side in FIG. 1 is moved in X1 direction (rightward as seen from the rear side of the projector 1), the projection lens 3 is moved in X3 direction (rightward). In contrast, when the dial 321 is moved in X2 direction (leftward as seen from the rear side of the projector 1), the projection lens 3 is moved in X4 direction (leftward).

Though not shown, a rib is vertically arranged on the inner side of the upper side 21A to surround a periphery of the projection lens 3.

A cutting portion 21C1 is formed at the lateral side 21C, through which a louver 71 having a plurality of blades 711 is exposed. The louver 71 constitutes a below-described exhaust unit.

Referring to FIG. 3, a cutting portion 21D1 that engages with the rear case 25 is formed on the rear side 21D.

As shown in FIGS. 1 to 4, the lower case 22 has a bottom side 22A, lateral sides 22B and 22C, a rear side 22D and a front side 22E as supporter faces.

As shown in FIG. 2, the bottom side 22A is an approximately planarly-viewed rectangle with a fixed leg 22A1 provided on the bottom side 22A approximately at the center of the rear side of the projector 1 and adjustment legs 27 provided thereon at both ends of the front side in a longitudinal direction.

Each adjustment leg 27 has a shaft member 271 (see FIG. 5) advanceably/retractably projecting from the bottom side 22A in an out-plane direction, so that the vertical and horizontal inclination of the projector 1 can be adjusted while the projector 1 projecting an image.

Further, as shown in FIG. 2, an opening 22A3 communicating with the inside of the exterior case 2 is formed at the bottom side 22A.

The opening 22A3 is a suction port for drawing in cooling air from the outside of the exterior case 2. A cover 22A5 with a plurality of openings formed is attached to the opening 22A3.

As shown in FIG. 4, a rib 22A6 is vertically arranged on the bottom side 22A to surround the periphery of the projection lens 3.

The lateral side 22B is vertically arranged on a longitudinal edge of the bottom side 22A to compose the lateral side of the exterior case 2 by engaging with the lateral side 21B of the upper case 21 as shown in FIG. 2.

On the lateral side 22B, a recess 22B1 is dented toward the upper case 21 to serve as a suspender for suspending the projector 1.

As shown in FIG. 1, the lateral side 22C is vertically arranged at the other longitudinal edge of the front side of the bottom side 22A to compose a part of the lateral side of the exterior case 2 by engaging with the lateral side 21C of the upper case 21. A cutting portion 22C1 is formed at the lateral side 22C by largely cutting out an upper edge thereof, so that the louver 71 constituting the below-described exhaust unit is exposed through the cutting portion 22C1. Thus, an opening with the louver 71 constituting the below-described exhaust unit exposed through it is formed by the cutting portion 21C1 of the lateral side 21C and the cutting portion 22C1 of the lateral side 22C. After cooling the inside of the projector 1, the air is discharged from the opening.

As shown in FIG. 3, the rear side 22D is vertically arranged on an edge of a shorter side of the bottom side 22A. A cutting portion 22D1 that engages with the rear case 25 is formed on the rear side 22D. Namely, in the present embodiment, the rear sides 21D, 22D and the rear case 25 compose the rear side of the exterior case 2.

A rectangular opening 22D2 is formed at the rear side 22D, and an inlet connector 22D3 is exposed through the opening 22D2. The inlet connector 22D3 is a terminal to supply the electric power supplied from the outside power source to the projector 1, the inlet connector 22D3 being connected to a below-described power source unit electrically.

Referring to FIG. 1 again, the front side 22E is vertically arranged on the other edge of the shorter side of the bottom side 22A. The front side 22E engages with the front case 23 to compose the front side of the exterior case 2.

As shown in FIGS. 1 and 2, the approximately ellipsoidal front case 23 has an opening 231 on the side of the longitudinal edge (right side in FIG. 1) to let the projection lens 3 expose through the opening 231. Though not shown, a first light shield for closing a gap between the opening 231 and the periphery of the projection lens 3, and a second light shield 12 (see FIG. 4) for closing a gap between the projection lens 3 and the projection lens position adjuster 30 are attached to the projection lens 3 exposed through the opening 231.

As shown in FIG. 1, a remote controller sensor window 232 is formed approximately at the center of the front case 23. A remote controller module (not shown) for receiving an operation signal from a remote controller (not shown) is disposed inside the remote controller sensor window 232.

An activation switch and an adjustment switch etc. similar to the one provided on the operation panel 26 are provided on the remote controller. When the remote controller is operated, an infrared signal corresponding to the operation is output from the remote controller to be received by a receiver via the remote controller sensor window 232, so that the infrared signal is processed by the below-described control board.

As shown in FIG. 4, a rib 234 is vertically arranged at the inner side of the front case 23 to surround the periphery of the projection lens 3. The rib 234, the rib 22A6 of the bottom side 22A of the lower case 22, and the rib of the upper side 21A of the upper case 21 compose a lens house to surround the projection lens 3.

As shown in FIGS. 1 and 3, the side case 24 has an upper side 24A and a lateral side 24C extending substantially vertically downward from the upper side 24A. The upper side 24A composes the upper side of the exterior case 2 by engaging with the upper side 21A of the upper case 21.

The lateral side 24C engages with the lateral side 21C of the upper case 21 and the lateral side 22C of the lower case 22.

As shown in FIG. 3, the rear case 25 is fixed by fitting into an opening formed by the cutting portion 21D1 of the rear side 21D of the upper case 21 and the cutting portion 22D1 of the rear side 22D of the lower case 22.

The rear case 25 is a planarly-viewed rectangle. A remote controller sensor window 232 similar to the one of the front case 23 is formed around the longitudinal edge of the rear case 25.

A dent 251 dented toward the inside of the exterior case 2 is formed on the rear case 25, and a plurality of connector terminals 252 are exposed from the dent 251.

The connector terminals 252 input an image signal and a sound signal etc. output from external electric equipments, and are connected to an interface board located inside the rear case 25.

Incidentally, the interface board is electrically connected to the below-described control board and the signal processed by the interface board is output to the control board.

(2) Internal Arrangement

Figure 5:
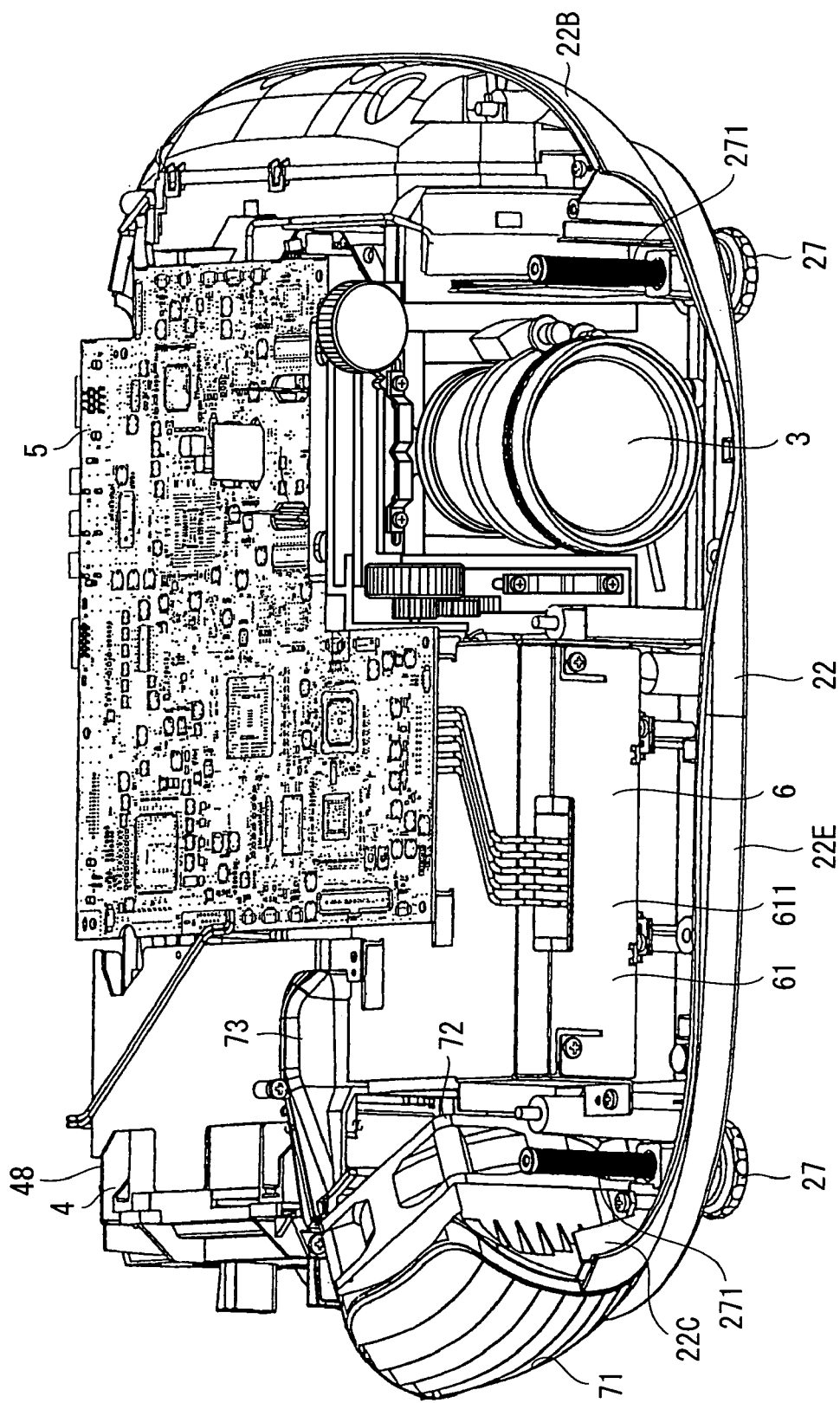
FIG. 5 is a perspective view showing an interior structure of the projector of the aforesaid embodiment.

FIG. 5 is an illustration showing the internal arrangement of the projector 1. More specifically, FIG. 5 only shows the lower case 22 of the exterior case 2, with the upper case 21, the front case 23, the side case 24 and the rear case 25 removed.

The device body of the projector 1 is housed inside the exterior case 2, the device body including the optical unit 4 horizontally extending along the longitudinal direction of the exterior case 2, the control board 5 disposed at an upper part of the optical unit 4, the power source unit 6, and the exhaust unit 7.

(2-1) Structure of Optical Unit 4

Figure 6:
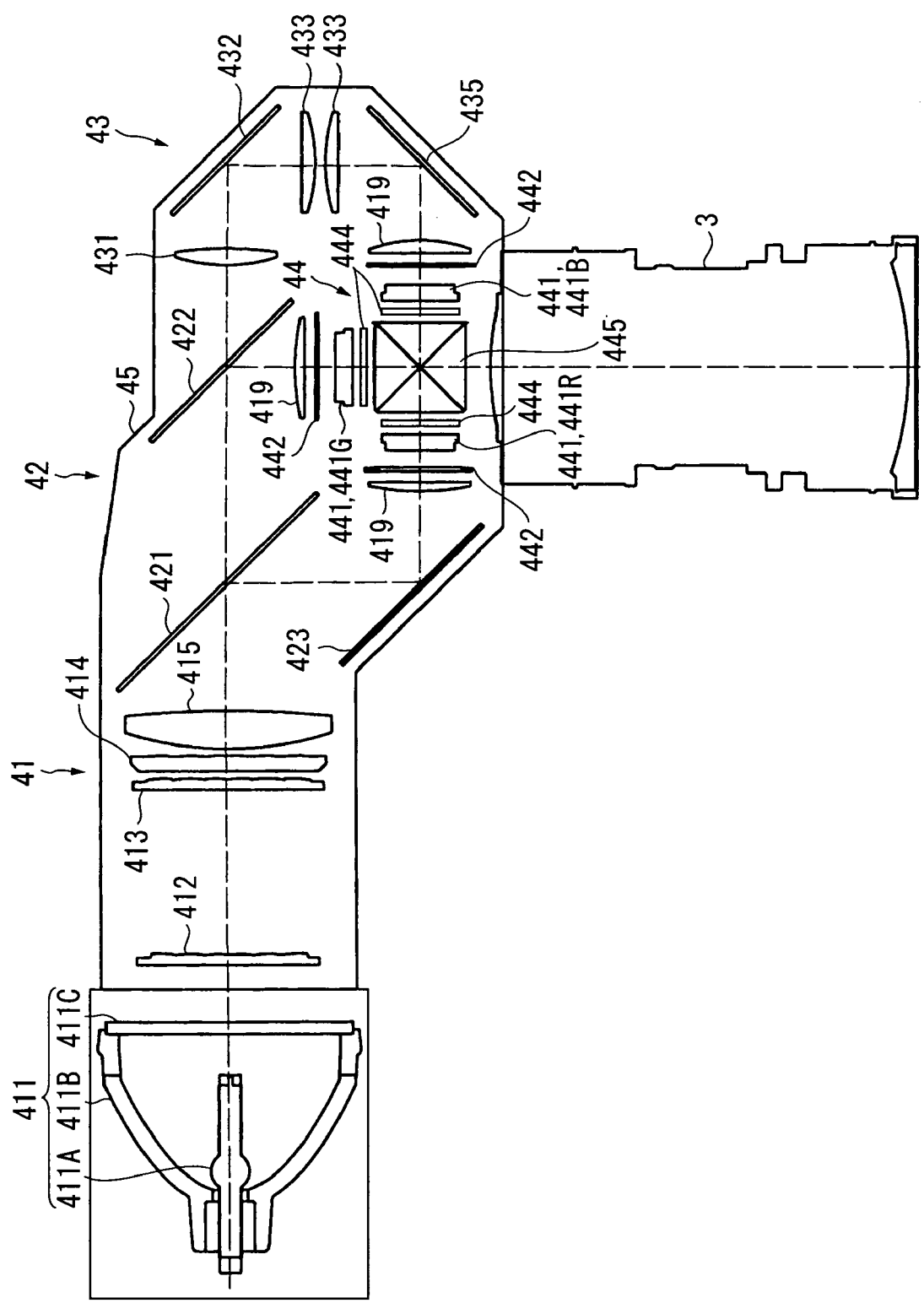
FIG. 6 is a schematic illustration showing an optical system of an optical unit of the aforesaid embodiment.

FIG. 6 is a schematic illustration showing an optical system of the optical unit 4.

The optical unit 4 modulates a light beam irradiated by a light source in accordance with image information to form an optical image, and forms a projected image on a screen through the projection lens 3. As shown in FIG. 6, the optical unit 4 includes functionally independent components of an integrator illuminating optical system 41, a color-separating optical system 42, a relay optical system 43, an optical device 44 integrating an optical modulator and a color-combining optical device, and an approximately rectangular parallelepiped inner case 45 (see FIG. 7) in which the optical components 41, 42, 43 and 44 are housed and arranged.

The integrator illumination optical system 41 is an optical system for equalizing the illuminance of the light beam irradiated by the light source on a plane orthogonal to the illumination optical axis. The integrator illuminating optical system 41 has a light source device 411, a first lens array 412, a second lens array 413, a polarization converter 414 and a superposing lens 415.

The light source device 411 has a light source lamp 411A (a radial light source), a reflector 411B, and an anti-explosion glass 411C covering a light-irradiation side of the reflector 411B. The radial light beam irradiated by the light source lamp 411A is reflected by the reflector 411B to be an approximately parallel light beam and is irradiated toward the outside. In the present embodiment, a high-pressure mercury lamp is used as the light source lamp 411A and a parabolic mirror is used as the reflector 411B. Incidentally, the light source lamp 411A may not be a high-pressure mercury lamp but may be a metal halide lamp or a halogen lamp. Further, though a parabolic mirror is used as the reflector 411B, an ellipsoidal mirror with a parallelizing concave lens disposed on the irradiation-side of an ellipsoidal mirror may alternatively be used.

The first lens array 412 has small lenses arranged in a matrix, the lenses having substantially rectangular profile seen in the illumination optical axis direction. The respective lenses separates the light beam irradiated by the light source lamp 411A into sub-beams and emits the sub-beams in the illumination optical axis direction.

The second lens array 413 is arranged approximately in the same manner as the first lens array 412, which includes small lenses arranged in a matrix. The second lens array 413 together with the superposing lens 415 superposes the image of the respective small lenses of the first lens array 412 onto the below-described liquid crystal panels 441R, 441G and 441B of the optical device 44.

The polarization converter 414 converts the light from the second lens array 413 into substantially uniform polarized light, thereby enhancing the light utilization efficiency of the optical device 44.

Specifically, the respective sub-beams converted into substantially uniform polarized light by the polarization converter 414 is substantially superposed on the below-described liquid crystal panels 441R, 441G and 441B of the optical device 44 by the superposing lens 415. Since only one-type of polarized light can be used in a projector using the liquid crystal panels 441R, 441G and 441B that modulates a polarized light, approximately half of the light beam from the light source lamp 411A emitting random polarized light cannot be used. Accordingly, with the use of the polarization converter 414, the light beam irradiated by the light source lamp 411A is converted into substantially uniform polarized light to enhance the light utilization efficiency of the optical device 44. Incidentally, such polarization converter 414 is disclosed in, for instance, Japanese Patent Laid-Open Publication No. H08-304739.

The color-separating optical system 42 has two dichroic mirrors 421 and 422, and a reflection mirror 423. The plurality of sub-beams irradiated by the integrator illuminating optical system 41 are separated into three color lights of red (R), green (G) and blue (B) by the two dichroic mirrors 421 and 422.

The relay optical system 43 has an incident-side lens 431, a pair of relay lenses 433, and reflection mirrors 432 and 435. The relay optical system 43 guides the color light (blue light) separated by the color-separating optical system 42 toward the below-described liquid crystal panel 441B of the optical device 44.

At this time, the dichroic mirror 421 of the color-separating optical system 42 transmits the green light component and blue light component of the light beam irradiated by the integrator illuminating optical system 41 and reflects the red light component. The red light reflected by the dichroic mirror 421 is reflected by the reflection mirror 423, and then reaches to the liquid crystal panel 441R for red color through a field lens 419. The field lens 419 converts the respective sub-beams irradiated by the second lens array 413 into a light beam parallel to the central axis (main beam) thereof. The field lenses 419 provided on the light-incident side of the other liquid crystal panels 441G and 441B function in the same manner.

In the blue and green lights transmitted through the dichroic mirror 421, the green light is reflected by the dichroic mirror 422, which reaches to the liquid crystal panel 441G for green light through the field lens 419. On the other hand, the blue light transmits through the dichroic mirror 422, which passes through the relay optical system 43 to reach the liquid crystal panel 441B for blue light through the field lens 419.

Incidentally, the relay optical system 43 is used for the blue light in order to avoid deterioration in the light utilization efficiency on account of light dispersion and the like caused by the longer length of the optical path of the blue light than the optical path of the other color light. In other words, the relay optical system 43 is used for directly transmitting the sub-beams incident on the incident-side lens 431 to the field lens 419. Incidentally, though the blue light of the three color lights passes through the relay optical system 43, the red light, for instance, may alternatively pass through the relay optical system 43.

The optical device 44 modulates the incident light beam in accordance with image information to form a color image. The optical device 44 has three incident-side polarization plates 442 on which the respective color lights separated by the color-separating optical system 42 are incident, the liquid crystal panels 441 (441R, 441G and 441B) as optical modulators and irradiate-side polarization plates 444 disposed on the downstream of the respective incident-side polarization plates 442, and a cross dichroic prism 445.

The liquid crystal panels 441R, 441G and 441B use, for instance, a polycrystalline silicon TFT as a switching element, which has a pair of opposing transparent substrates with liquid crystal sealed therebetween. The liquid crystal panels 441R, 441G and 441B irradiate the light beam incident thereon through the incident-side polarization plates 442 after modulating in accordance with image information.

The incident-side polarization plates 442 transmits a polarized light in a predetermined direction out of the respective color lights separated by the color-separating optical system 42 and absorbs the other light beam, which have a substrate made of sapphire glass and the like with a polarization film attached thereon.

The irradiation-side polarization plate 444 is also arranged substantially in the same manner as the incident-side polarization plate 442, which transmits the polarized light in a predetermined direction out of the light beam irradiated by the liquid crystal panels 441R, 441G and 441B, where the polarization axis of the transmitted polarized light is set orthogonal to the polarization axis of the polarized light transmitted through the incident-side polarization plate 442.

The cross dichroic prism 445 combines the optical image irradiated by the irradiation-side polarization plate 444 and modulated for each color light to form a color image. In the cross dichroic prism 445, a dielectric multi-layer film for reflecting the red light and a multi-layer film for reflecting the blue light are formed along the boundaries of four right-angle prisms approximately in X-shape, the dielectric multi-layer films combining the three color lights.

The above-described liquid crystal panels 441R, 441G and 441B, the irradiation-side polarization plates 444 and the cross dichroic prism 445 are integrated as a unit.

Figure 7:
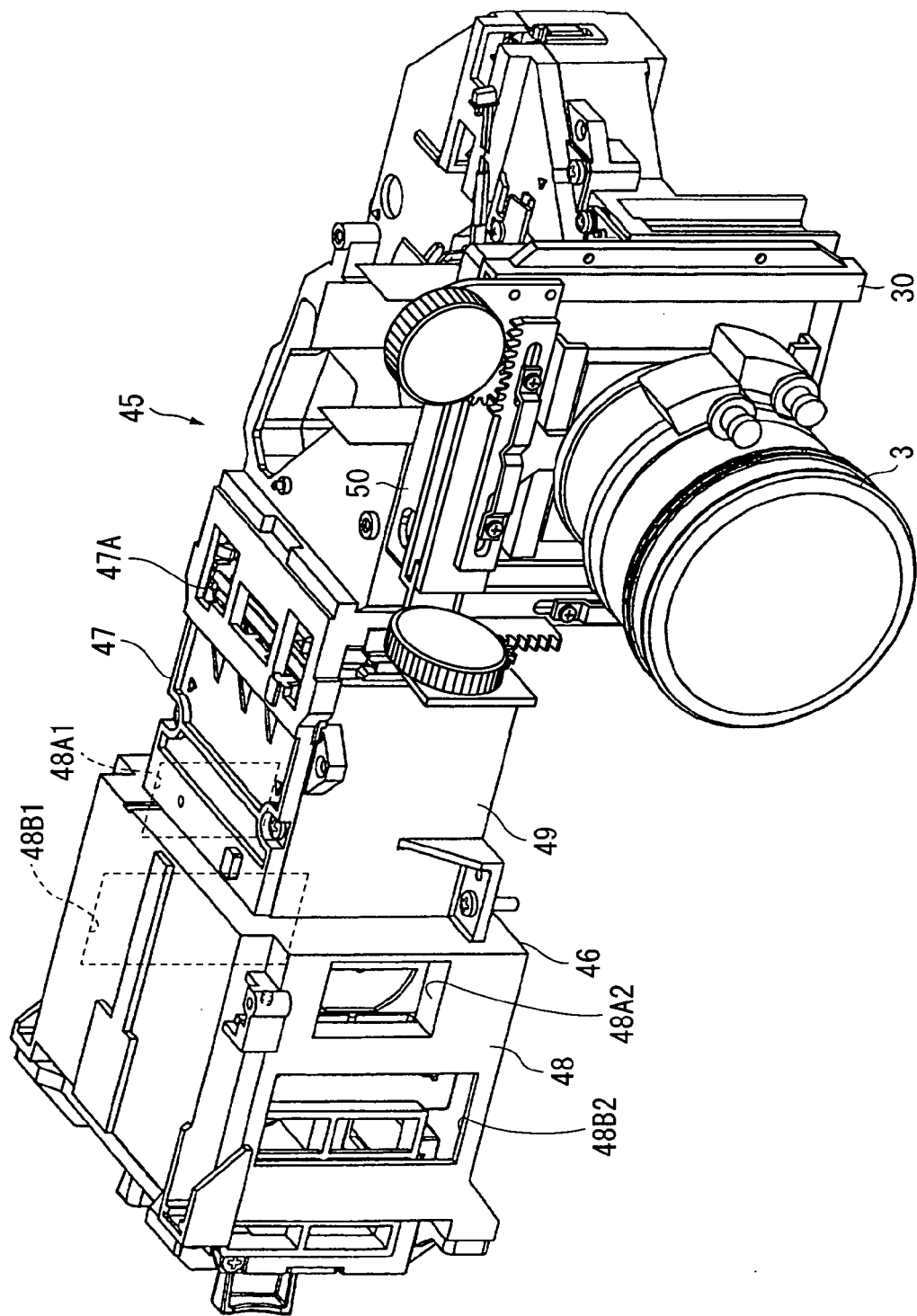
FIG. 7 is a perspective view showing a light guide of the aforesaid embodiment.

FIG. 7 is an illustration showing the structure of the inner case 45.

The inner case 45 is a synthetic resin component formed by injection molding and the like, which includes a lower inner case 46 where the above-described optical components 41, 42, 43 and 44 are housed, and a lid-shaped upper inner case 47 for closing the upper opening of the lower inner case 46.

The lower inner case 46 has a light source housing 48 where the light source device 411 is housed, and a component housing 49 formed in a container where other optical components are housed except the light source device 411.

The light source housing 48 has an approximately box-shape, and openings are respectively formed on a distal side near the component housing 49 and on a side opposite thereto. The opening formed on the side near the component housing 49 transmits a light beam irradiated by the light source device 411. The opening formed on the side opposite to the side near the component housing 49 serves as an opening through which the light source device 411 is housed by inserting from the lateral side of the light source housing 48.

As shown in FIG. 7, inflow openings 48A1, 48B1 and outflow openings 48A2, 48B2 for circulating the cooling air through the light source housing 48 are respectively formed on the front end and the rear end of the light source housing 48, the inflow openings 48A1, 48B1 and the outflow openings 48A2, 48B2 being opposite each other.

The component housing 49 is an approximately rectangular parallelepiped with an upper side thereof being opened, an end thereof being connected to the light source housing 48. A head 50 on which the projection lens 3 is fixed by screws is attached to the other end of the component housing 49. The head 50 places the projection lens 3 at a predetermined position on the illumination optical axis set inside the inner case 45.

Though not specifically shown here, a plurality of grooves for slidably fitting the optical components 412 to 415, 419, 421 to 423 and 431 to 435 are formed at the component housing 49. The optical device 44 is placed at a part of the component housing 49 adjacent to the head 50.

The upper inner case 47 closes an upper opening of the component housing 49 of the lower inner case 46, but does not close above the optical device 44. A plurality of openings 47A are formed at the upper inner case 47 by penetrating through it, so that the air having cooled the inside of the inner case 45 is discharged from the openings 47A.

(2-2) Structure of Control Board 5

As shown in FIG. 5, the control board 5 is disposed above the upper inner case 47 of the inner case 45. The control board 5 is a circuit board having a processor such as a CPU (Central Processing Unit) installed thereon, which controls the operation of the entire projector 1. The control board 5 controllably drives the liquid crystal panels 441R, 441G and 441B based on the signal outputted by the above-described interface board. The liquid crystal panels 441R, 441G and 441B modulate the light beam to form an optical image. Further, an operation signal outputted by the circuit board of the above-described operation panel 26 and the non-illustrated remote-controller light-receiving module is inputted to the control board 5 and the control board 5 outputs a control command to the components of the projector 1 based on the operation signal.

(2-3) Structure of Power Source Unit 6

The power source unit 6 for supplying the electric power to the light source device 411 and the control board 5 etc., is disposed along the longitudinal direction of the front case 23 of the exterior case 2. The power source unit 6 has a power source block 61 containing a power source circuit, a lamp drive block (not shown) disposed below the power source block 61.

The power source block 61 supplies the electric power from the outside to the lamp drive block and the control board 5 etc. through the power cable connected to the inlet connector 22D3. The power source block 61 has a circuit board having a transformer for converting the inputted alternate-current into a low-voltage direct-current and a converter for converting the output of the transformer into a predetermined voltage on one side thereof, and a tube component 611 (shield component) covering the circuit board. The tube component 611 is made of aluminum and is formed in an approximately box-shape with both ends being opened.

The lamp drive block is a converter for supplying the electric power to the above-described light source device 411 at a constant voltage. The alternate-current electricity input from the power source block 61 is commutated and converted into the direct-current electricity or the alternate-current electricity in rectangular wave by the lamp drive block to be supplied to the light source device 411.

(2-4) Structure of Exhaust Unit 7

Figure 8:
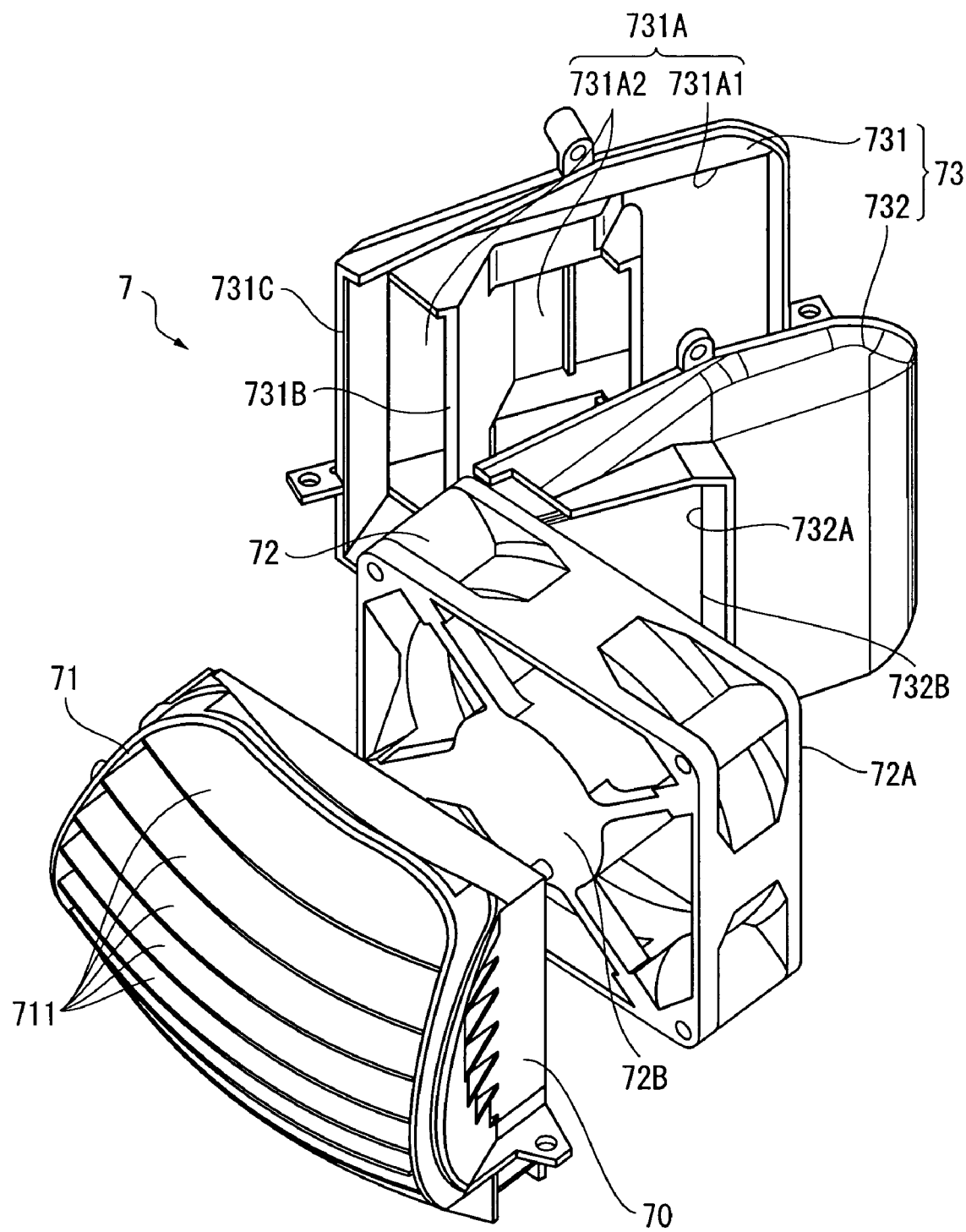
FIG. 8 is an illustration showing an exhaust unit of the aforesaid embodiment.
Figure 9:
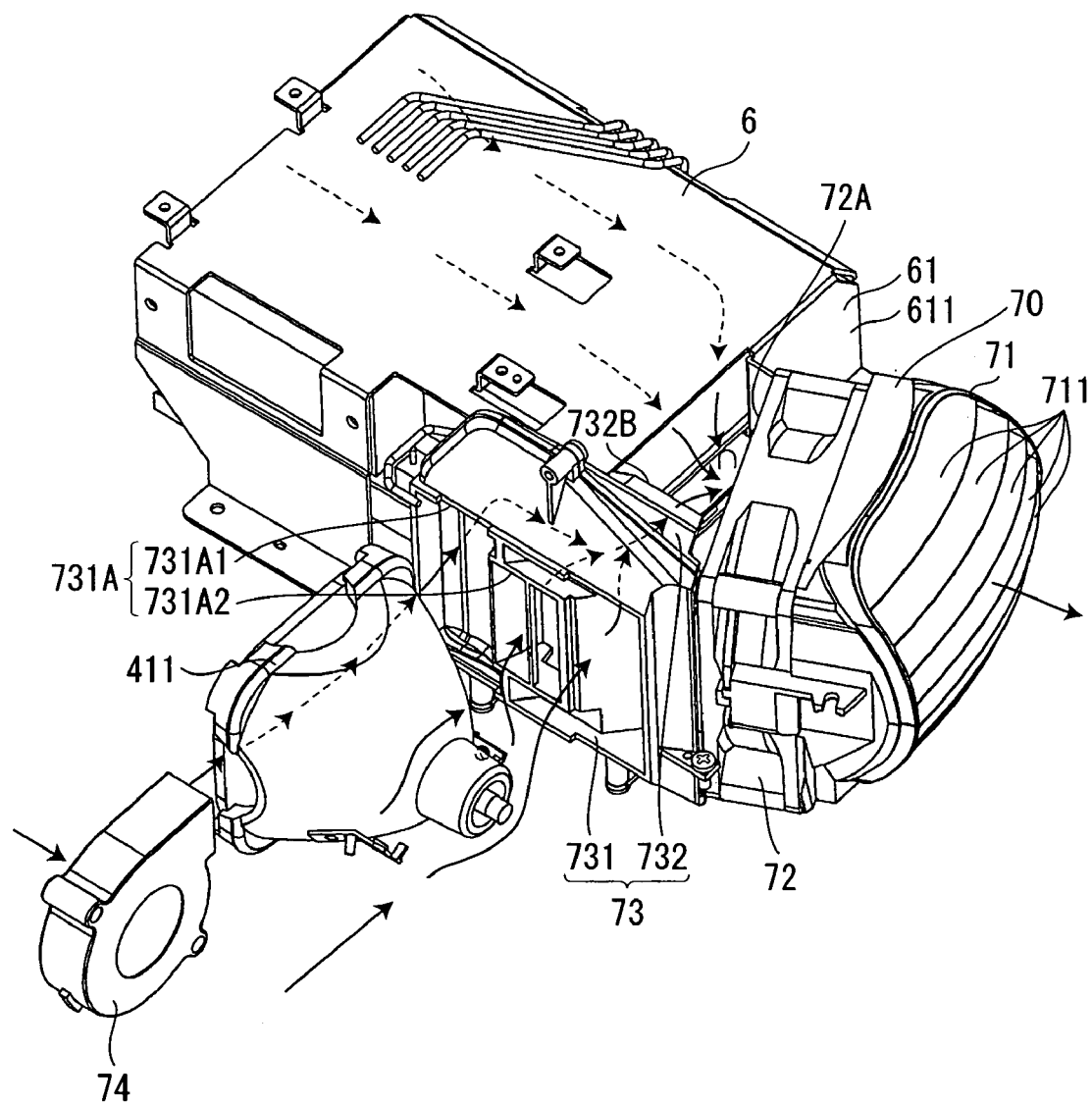
FIG. 9 is an illustration showing the exhaust unit of the aforesaid embodiment.
Figure 10:
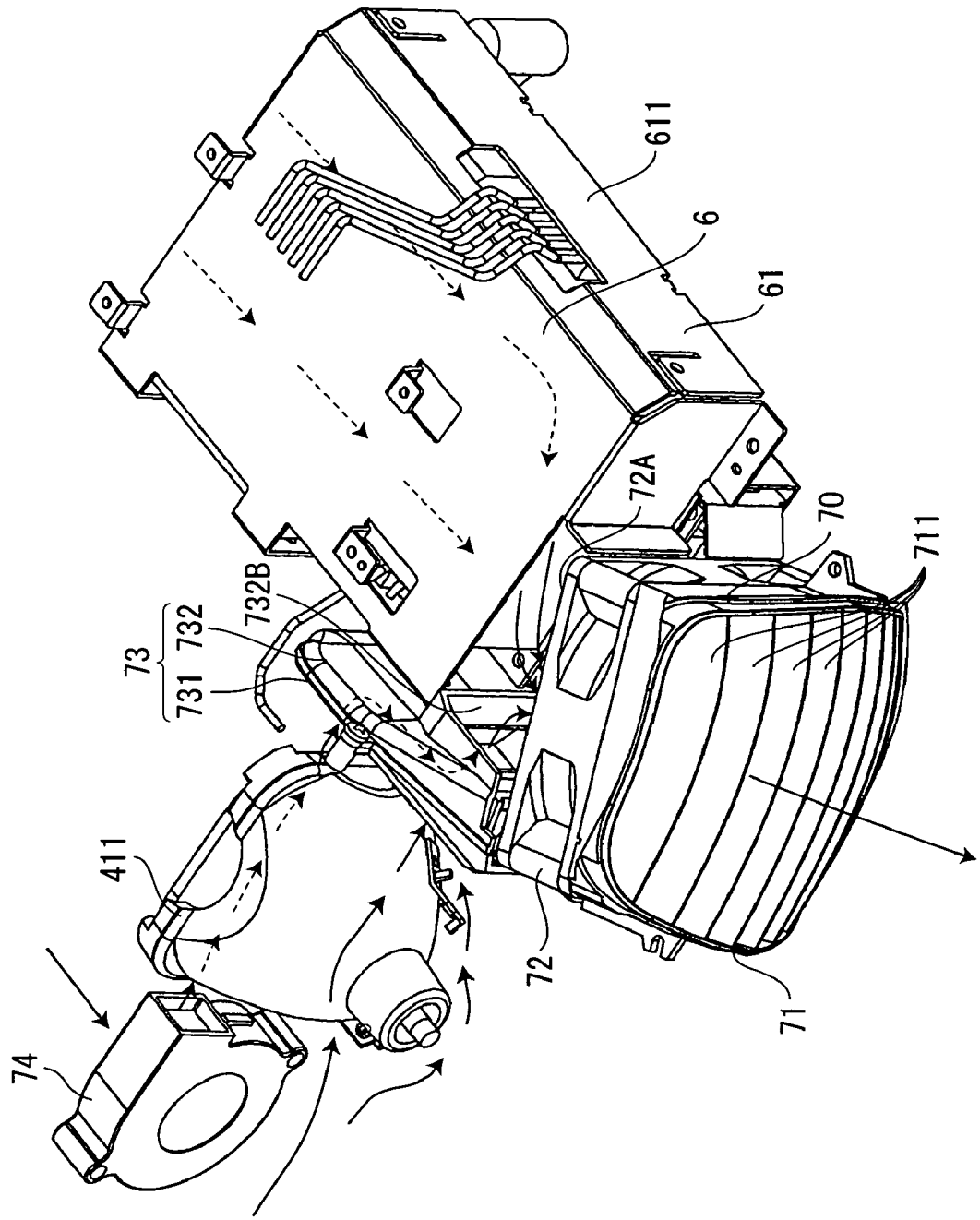
FIG. 10 is an illustration showing the exhaust unit of the aforesaid embodiment.

FIGS. 8 to 10 each show the exhaust unit 7. More specifically, FIG. 8 is an exploded perspective view showing the exhaust unit 7. FIGS. 9 and 10 are illustrations each showing an arrangement and structure of the exhaust unit 7.

As shown in FIGS. 8 to 10, the exhaust unit 7 is arranged at an approximately planarly-viewed L-shaped corner defined by the light source device 411 and the power source unit 6 to discharge the heated air inside the projector 1, especially the air heated by the light source device 411 and the power source unit 6, to the outside of the projector 1. The above exhaust unit 7 has a discharge-side duct 70 including the louver 71, an exhaust fan 72 as a cooling fan, and a suction-side duct 73.

The suction-side duct 73 is interposed between the light source device 411 and the exhaust fan 72 for guiding the air heated by the light source device 411 toward the exhaust fan 72. The duct 73 is a synthetic resin molding formed by injection molding etc. As shown in FIG. 8, the duct 73 includes a first duct component 731 and a second duct component 732 as plate bodies and the duct 73 is formed by combining the duct components 731 and 732.

As shown in FIG. 8, the first duct component 731 is an approximately planarly-viewed rectangle with its shape having an approximately U-shaped cross-section with its edge projecting toward the second duct component 732.

Also as shown in FIG. 8, a suction hole 731A is formed at a rectangular plate face of the first duct component 731 by penetrating through it and a projection 731B is also formed as projecting from the plate face toward the second duct component 732 and vertically extending.

The suction hole 731A draws in the air heated by the light source device 411 to the inside of the suction-side duct 73. As shown in FIG. 9, the suction-hole 731A has a first suction hole 731A1 formed at a position facing a light-irradiation side, and a second suction hole 731A2 formed at a position facing a rear side of the light source device 411.

The first suction hole 731A1 is formed at a right side of the plate face of the first duct component 731, in FIG. 8. The cooling air blown to the light source device 411 from the sirocco fan 74 (FIGS. 9 and 10) that cools the light source device 411 is flowed inside the light source housing 48 through an inflow opening 48A1 (FIG. 7) formed at a lateral side of the light source housing 48. The cooling air is then heated by circulating through the inside of the light source device 411. The heated air is taken into the suction-side duct 73 through an outflow opening 48A2 and the first suction hole 731A1.

The second suction holes 731A2 are respectively formed approximately at the center of and at a left side of the plate face of the first duct component 731, in FIG. 8. The air is flowed inside the light source housing 48 through an inflow opening 48B1 (FIG. 7) formed at the lateral side of the light source housing 48. The air is then heated by circulating along the reflector 411B of the light source device 411. The heated air is flowed outside the light source housing 48 through an outflow opening 48B2, and the heated air is taken into the suction-side duct 73 through the second suction holes 731A2.

The projection 731B guides the heated air taken into the suction-side duct 73 from the suction hole 731A to a below-described discharge hole of the second duct component 732 while the first duct component 731 is combined with the second duct component 732.

As the first duct component 731, the second duct component 732 is an approximately planarly-viewed rectangle having an approximately U-shaped cross-section with its edge projecting toward the first duct component 731.

As shown in FIG. 8, a left edge of the second duct component 732 has a planarly-viewed U-shaped cutting portion 732A.

The cutting portion 732A has a shape with a peripheral edge of an opening thereof projecting toward the outside of the suction-side duct 73. The peripheral edge of the opening connects a lateral side 731C of the first duct component 731 while the first duct component 731 is combined with the second duct component 732. Therefore, a discharge hole 732B of the suction-side duct 73 is formed by the connected peripheral edge of the opening and the lateral side 731C.

According to the shape of the above-described suction-side duct 73, the first suction hole 731A1 does not interfere with the discharge hole 732B on a plane seen from a suction direction or a discharge direction of the heated air. On the other hand, the second suction hole 731A2 interferes with the discharge hole 732B on a plane seen from the suction direction or the discharge direction of the heated air.

The exhaust fan 72, which is an axial-flow fan with the suction direction of the heated air is approximately the same as the discharge direction thereof, includes a suction port 72A and a exhaust port 72B (FIG. 8) to suck and discharge the heated air passing through the suction-side duct 73 and the power source unit 6.

As shown in FIG. 9 or 10, an end of the suction port 72A of the exhaust fan 72 is inclined relative to a discharge face of the discharge hole 732B of the suction-side duct 73. In other words, as shown in FIG. 9 or 10, the exhaust fan 72 is inclined so as to be opposite to the suction-side duct 73 and also to an end of the power source unit 6.

The discharge-side duct 70 has a cylindrical shape that circulates the heated air with the louver 71 provided at the discharge side of the heated air.

As shown in FIGS. 8 to 10, the louver 71 has the plurality of horizontally extending blades 711 arranged in parallel.

According to the above-described structure of the exhaust unit 7, a flow path is formed as follows.

The cooling air discharged from the sirocco fan 74 (FIGS. 9 and 10) flows into the light source housing 48 (FIG. 7) through the inflow opening 48A1 (FIG. 7) formed at the lateral side of the light source housing 48 of the inner case 45. The cooling air flowed inside the light source housing 48 (FIG. 7) flows into the light source device 411 as shown in FIG. 9 or 10 to cool the light source lamp 411A (FIG. 6). The heated air due to cooling the light source lamp 411A (FIG. 6) flows outside the light source device 411, further flows through the outflow opening 48A2 (FIG. 7) formed at the lateral side of the light source housing 48, and is taken into the suction-side duct 73 through the first suction hole 731A1 of the suction-side duct 73. The heated air taken into the suction-side duct 73 turns at the plate face of the second duct component 732 to circulate along the plate face. The heated air circulating along the plate face flows outside the suction-side duct 73 through the discharge hole 732B formed around the end of the second duct component 732. Namely, the heated air circulating the suction-side duct 73 through the first suction hole 731A1 is circulated in a planarly-viewed cranked way. The heated air passing through the suction-side duct 73 is sucked by the suction port 72A of the exhaust fan 72 and discharged to the outside of the projector 1 through the discharge-side duct 70.

The air guided by the exhaust fan 72 and flowed inside the light source housing 48 (FIG. 7) through the inflow opening 48B1 (FIG. 7) formed at the lateral side of the light source housing 48 of the inner case 45 is heated by circulating along a rear side of the reflector 411B of the light source device 411 as shown in FIG. 9 or 10. The air heated around the rear side of the light source device 411 flows through the outflow opening 48B2 (FIG. 7) formed at the lateral side of the light source housing 48, taken into the suction-side duct 73 through the second suction hole 731A2 of the suction-side duct 73, and then discharged to the outside of the suction-side duct 73 through the discharge hole 732B approximately facing the second suction hole 731A2. Namely, the heated air circulating through the suction-side duct 73 via the second suction hole 731A2 is circulated approximately linearly. The heated air passing through the suction-side duct 73 is sucked by the suction port 72A of the exhaust fan 72 and discharged to the outside of the projector 1 through the discharge-side duct 70.

Further, as shown in FIG. 9 or 10, the air heated by the power source unit 6 is guided by the exhaust fan 72 along the inner side of the tube component 611 to merge the heated air flowed from the discharge hole 732B of the suction-side duct 73. The heated air is then sucked from the suction port 72A of the exhaust fan 72 to be discharged to the outside of the projector 1 through the discharge-side duct 70. Note that, the blades 711 of the louver 71 has a shape extending along a direction in which the air heated by the light source device 411 and the air heated by the power source unit 6 are combined, in other words, along a plane formed by an L-shaped end of the planarly-viewed L-shape defined by the light source device 411 and the light source unit 6.

(3) Advantages of Embodiment

According to the above-described embodiment, following advantages can be obtained.

(3-1) The suction-side duct 73 is interposed between the light source device 411 and the exhaust fan 72, so that the first suction hole 731A1 and the discharge hole 732B are formed not to interfere with each other on a plane seen from the suction direction or the discharge direction of the heated air. Therefore, even when a part of the light beam irradiated by the light source device 411 is deviated from the illumination optical axis to leak inside the projector, the leaked light heading to the exhaust fan 72 from the light source device 411 can be shielded by the first duct component 731 and the second duct component 732 of the suction-side duct 73. Consequently, the light beam leaked outside the projector 1 via the opening defined by the cutting portions 21C1 and 22C1 of the exterior case 2 can be reduced to avoid that a viewer feels uncomfortable while viewing an image projected by the projector 1.

(3-2) Since the suction-side duct 73 is formed by combining the first duct component 731 and the second duct component 732 so as to be an approximately rectangular parallelepiped, the suction-side duct 73 can be downsized compared to the one formed in an approximately planarly-viewed cranked shape. Therefore, the suction-side duct 73 can be disposed without the gap between the light source device 411 and the exhaust fan 72 formed larger than necessary. Since the first duct component 731 and the second duct component 732 are molding products formed by injection molding or the like, the suction-side duct 73 can easily be manufactured. Since the connected part of the first duct component 731 and the second duct component 732 intersects with a line connecting the light source device 411 and the exhaust fan 72, the light beam can be prevented from leaking via the connected part, thus further reducing the light beam to leak outside the projector 1.

(3-3) Since the second suction hole 731A2 is formed at the suction-side duct 73 in addition to the first suction hole 731A1 and the discharge hole 732B, the heated air remained inside the light source device 411 as well as the one remained at the rear side of the light source device 411 can be guided toward the exhaust fan 72. Therefore, the light leaked from the light source device 411 can be shielded while the cooling efficiency of the light source device 411 can be enhanced.

(3-4) The louver 71 provided at the exhaust-side duct 70 has the plurality of blades 711, the blades 711 extending in a direction in which the heated air passing through the suction-side duct 73 and the heated air inside the power source unit 6 are combined. Accordingly, the exhaust airflow of the heated air can properly be rectified while the temperature of the exhaust airflow can be lowered by mixing the heated air caused by the light source device 411 and the heated air generated inside the power source unit 6.

(3-5) Since the sirocco fan 74 is provided around the light source device 411 so that the sirocco fan 74 blows the cooling air to the light source device 411, the air heated by the light source device can properly be circulated inside the suction-side duct 73 by the sirocco fan 74 and the exhaust fan 72, thus enhancing the cooling efficiency of the light source device 411.

(4) Modifications of Embodiment

While the present invention has been described above with the preferable embodiment, the present invention is not limited to the above-described embodiment, but includes improvements and modifications as long as an object of the present invention can be achieved.

In the above embodiment, the suction-side duct 73 is formed by combining the first duct component 731 and the second duct component 732 each having an approximately U-shaped cross-section to be an approximately rectangular parallelepiped, however, it is not limited thereto. The suction-side duct 73 may employ any shape as long as the first suction hole 731A1 does not interfere with the discharge hole 732B on a plane seen from the suction direction or the discharge direction of the heated air. For example, the shape of the suction-side duct may be an approximately planarly-viewed cranked shape with a first suction hole formed at an end thereof, and a discharge hole formed at the other end thereof. Besides, the above end may be disposed around the light source device 411 whereas the other end may be disposed around the exhaust fan 72.

In the above embodiment, the discharge hole 732B of the suction-side duct 73 is so formed that the lateral side 731C formed at the first duct component 731 connects an edge of the opening of the cutting portion 732A formed at the second duct component 732, it is not limited thereto. As in the case of the first suction hole 731A1 of the first duct component 731, a discharge hole may be formed at the plate face of the second duct component 732 so as to penetrate through it without the cutting portion 732A formed at the second duct component 732.

Though a projector using three optical modulators are taken as an example in the above embodiment, the present invention may be applied to a projector using a single optical modulator, two optical modulators or more than three optical modulators.

Though a liquid crystal panel is used as the optical modulator in the above embodiment, an optical modulator other than the liquid crystal panel such as a device using a micro-mirror may be used.

Though a light transmissive optical modulator having different light-incident side and light-irradiation side is used in the above embodiment, a reflective optical modulator having common light-incident side and light-irradiation side may be used.

Though a front-type projector that projects an image in a direction for observing a screen is taken as an example in the above embodiment, the present invention may be applied to a rear-type projector that projects an image in a direction opposite to the direction for observing the screen.

In the above embodiment, while the suction-side duct 73 is installed on the projector 1, the suction-side duct 73 may be installed on any other optical equipment having a light source.

Although the best configuration for implementing the present invention has been disclosed above, the present invention is not limited to the best configuration. In other words, the present invention is mainly illustrated and described on the specific embodiment, however, a person skilled in the art can modify the specific configuration such as shape, material, quantity on the above-described embodiment as long as a technical idea and an object of the present invention can be achieved.

Therefore, the description that limits the shape and the material is only the example to make the present invention easily understood, but does not intend to limit the present invention, so that the present invention includes the description using a name of component without a part of or all of the limitation on the shape and the material etc.

What is claimed is:

1. A duct having a cylindrical shape and circulating a heated air, which is interposed between a light source device that irradiates a light beam and a cooling fan that sucks and discharges an air, the duct comprising:
   a first suction hole that draws in the air heated by the light source device to the inside of the duct; and
   a discharge hole that discharges the indrawn heated air toward the cooling fan,
   wherein the first suction hole and the discharge hole are located not to interfere with each other on a plane seen from a suction direction or a discharge direction of the heated air.

2. The duct according to claim 1, wherein the duct is formed by combining two plate bodies having approximately U-shaped cross-sections with the first suction hole and the discharge hole respectively formed.

3. The duct according to claim 1,
   wherein the first suction hole draws in the heated air circulating inside the light source device to the inside of the duct, and
   wherein the duct further comprises a second suction hole that draws in a heated air circulating along an outer side of the light source device to the inside of the duct.

4. A projector comprising:
   a light source device;
   an optical modulator that modulates a light beam irradiated by the light source device in accordance with image information;
   a projection optical device that projects the modulated light beam in an enlarged manner;
   a duct interposed between the light source device that irradiates the light beam and a cooling fan that sucks and discharges an air, the duct having a first suction hole that draws in the air heated by the light source device to the inside of the duct, and a discharge hole that discharges the indrawn heated air toward the cooling fan, in which the first suction hole and the discharge hole are located not to interfere with each other on a plane seen from a suction direction or a discharge direction of the heated air, the duct having a cylindrical shape and circulating the heated air; and
   the cooling fan that sucks and discharges the heated air discharged from the duct.

5. The projector according to claim 4,
   wherein a suction face of the cooling fan from which the heated air is sucked is inclined relative to a discharge face of the discharge hole of the duct so that the cooling fan sucks and discharges the heated air inside the projector together with the heated air passing through the duct,
   wherein a louver with a plurality of blades arranged in parallel is provided to the cooling fan on a discharge side of the heated air, and
   wherein the plurality of blades extend in a direction in which the heated air passing through the duct and the heated air inside the projector are combined.

6. The projector according to claim 4, wherein the duct is formed by combining two plate bodies having approximately U-shaped cross-sections with the first suction hole and the discharge hole respectively formed.

7. The projector according to claim 4,
   wherein the first suction hole draws in the heated air circulating inside the light source device to the inside of the duct, and
   wherein the duct further comprises a second suction hole that draws in a heated air circulating along an outer side of the light source device to the inside of the duct.

* * * * *